(No Model.) 10 Sheets—Sheet 1.

T. ENGLISH.
TUNNELING MACHINE.

No. 307,278. Patented Oct. 28, 1884.

Witnesses:
T. C. Brecht
A. H. Norris

Inventor
Thos. English,
J. L. Norris,
Attorney (No Model.)  10 Sheets—Sheet 2.
T. ENGLISH.
TUNNELING MACHINE.
No. 307,278. Patented Oct. 28, 1884.
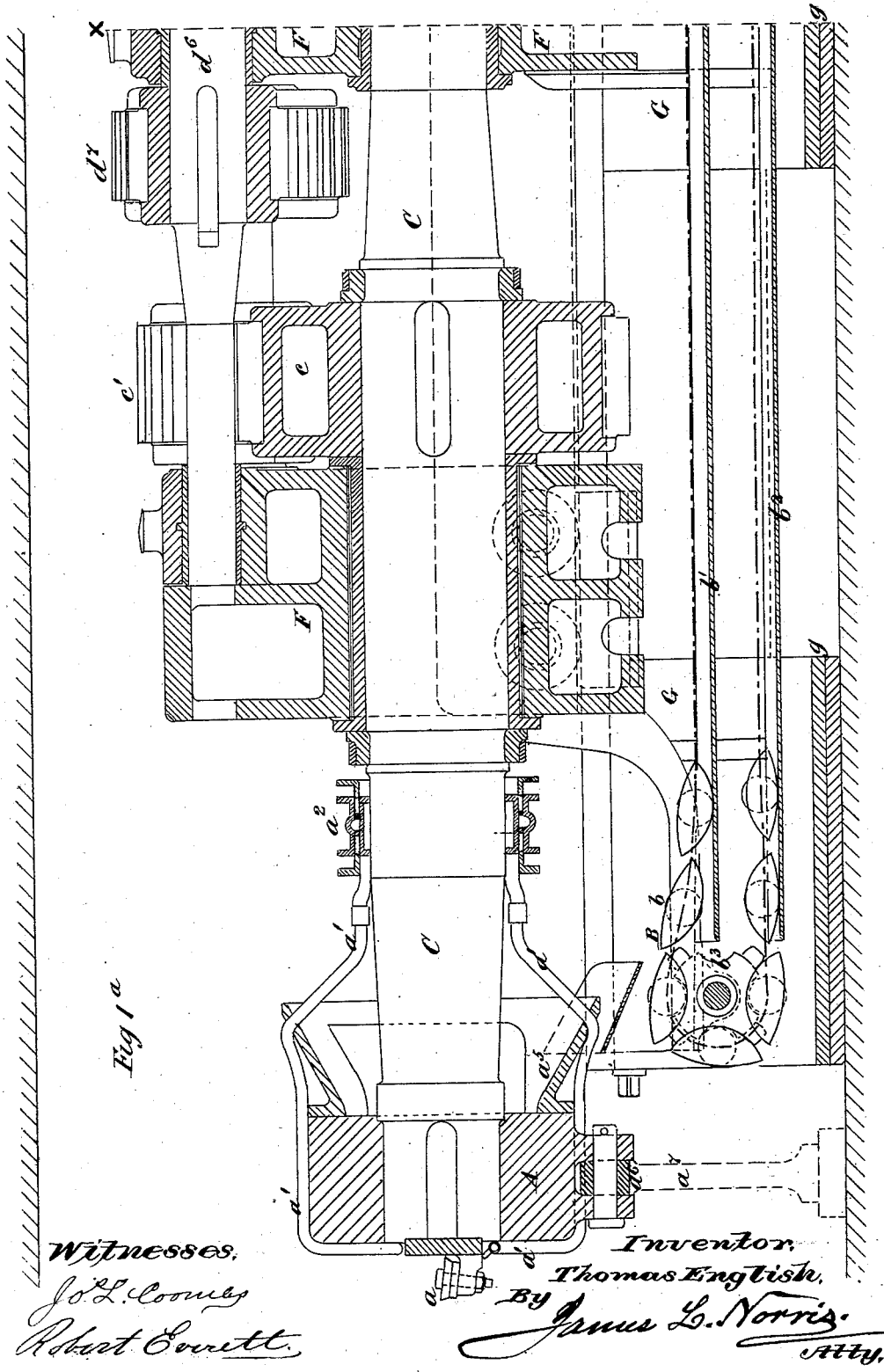
Witnesses,
Jo. L. Coomes
Robert Everett
Inventor,
Thomas English,
By James L. Norris.
Atty.

(No Model.) 10 Sheets—Sheet 3.
T. ENGLISH.
TUNNELING MACHINE.
No. 307,278. Patented Oct. 28, 1884.
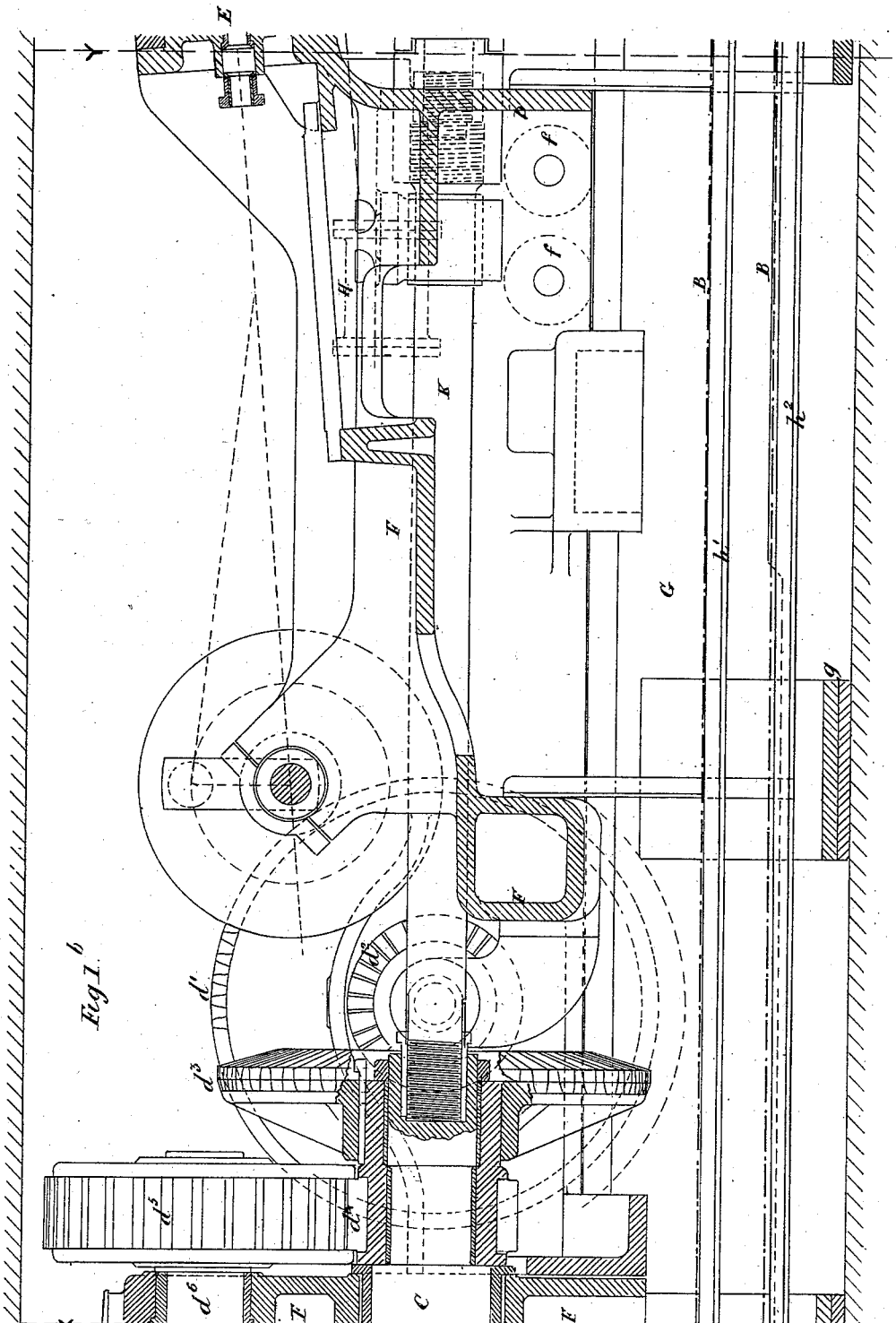
Witnesses,
Jo. L. Coombs
Robert Everett
Inventor.
Thomas English.
By James L. Norris, Atty.

(No Model.) 10 Sheets—Sheet 4.
T. ENGLISH.
TUNNELING MACHINE.
No. 307,278. Patented Oct. 28, 1884.
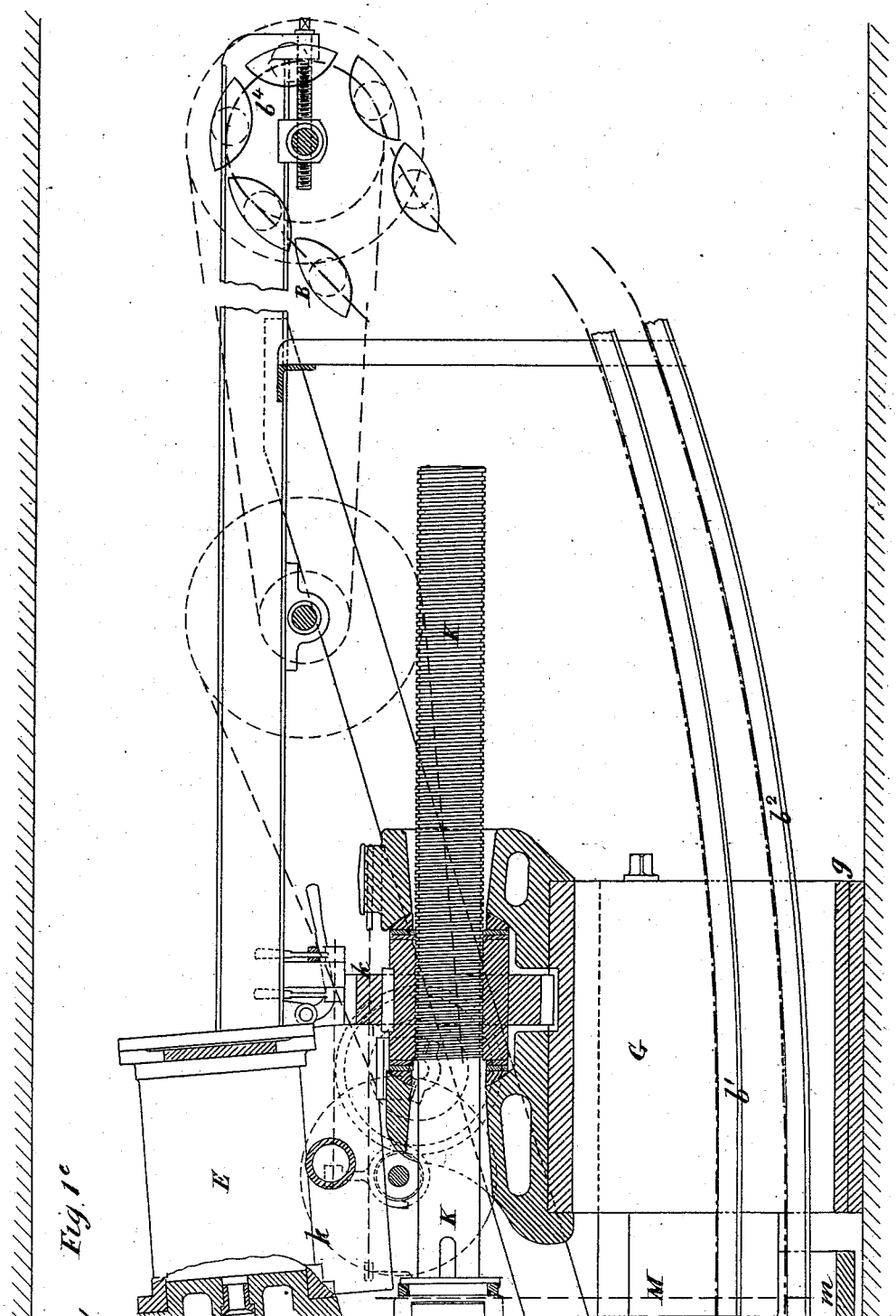
Fig. 1ᶜ
Witnesses.
Jo. L. Coombs
Robert Everett
Inventor,
Thomas English.
By James L. Norris
Atty.

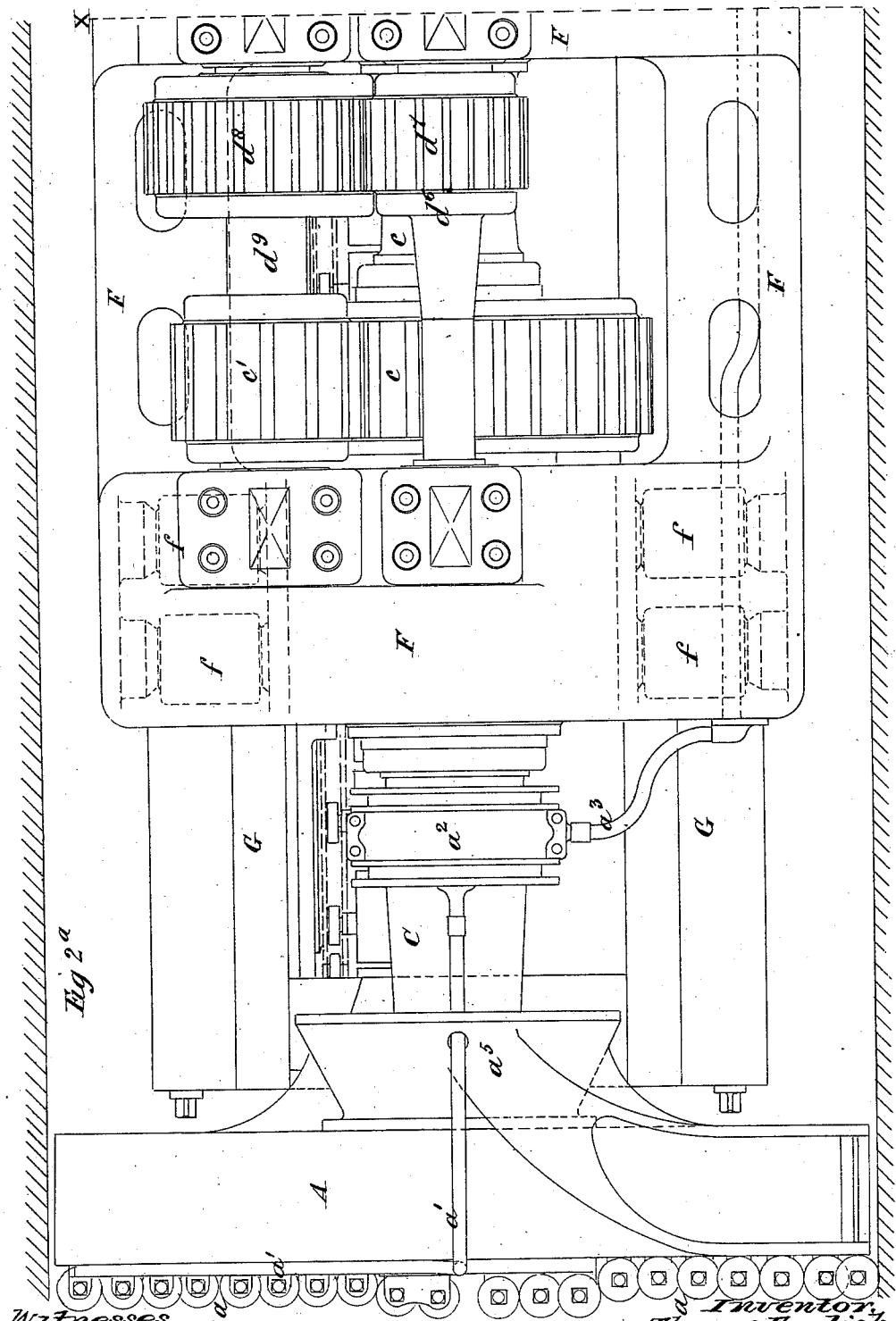

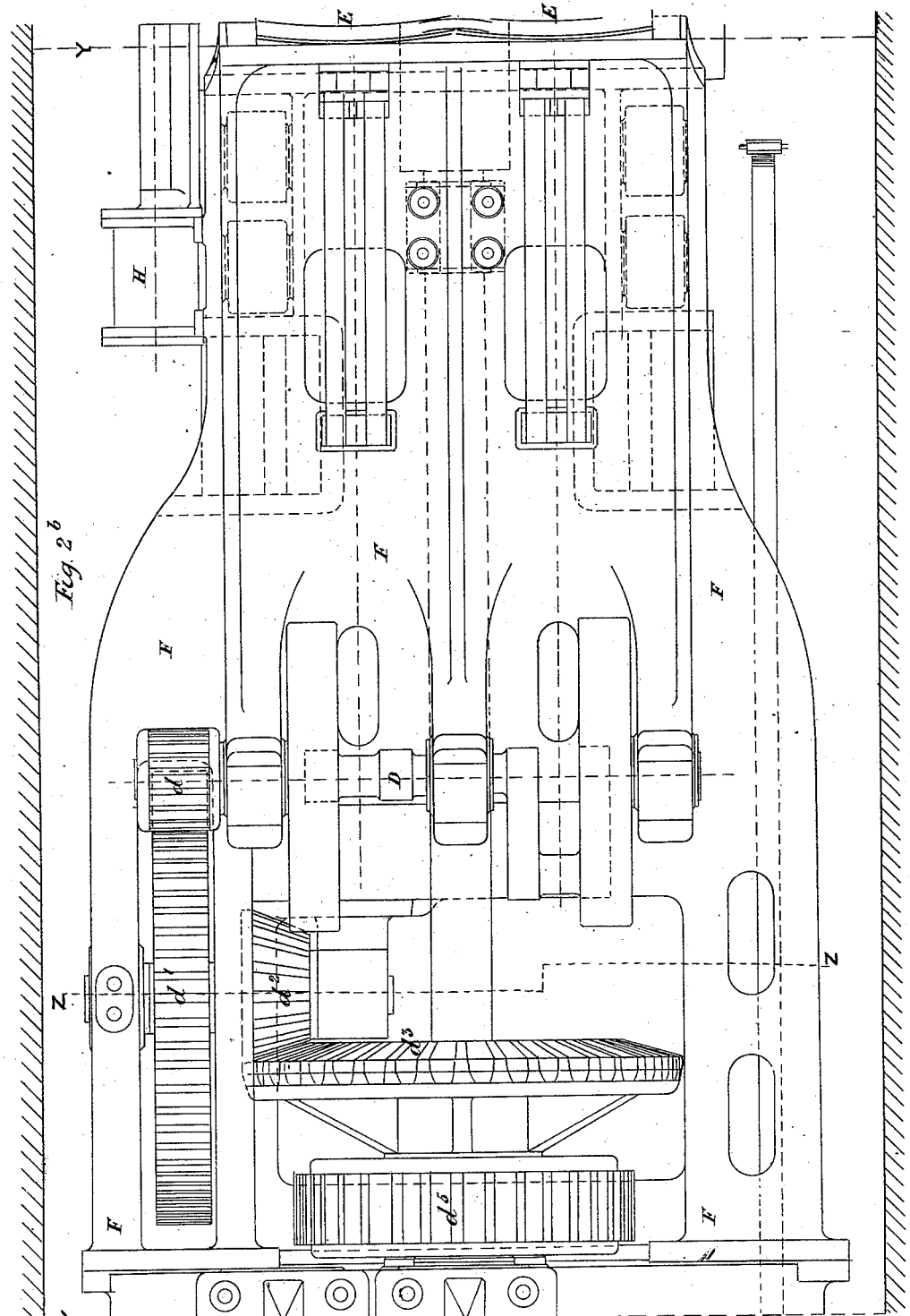

(No Model.) 10 Sheets—Sheet 7.
T. ENGLISH.
TUNNELING MACHINE.
No. 307,278. Patented Oct. 28, 1884.
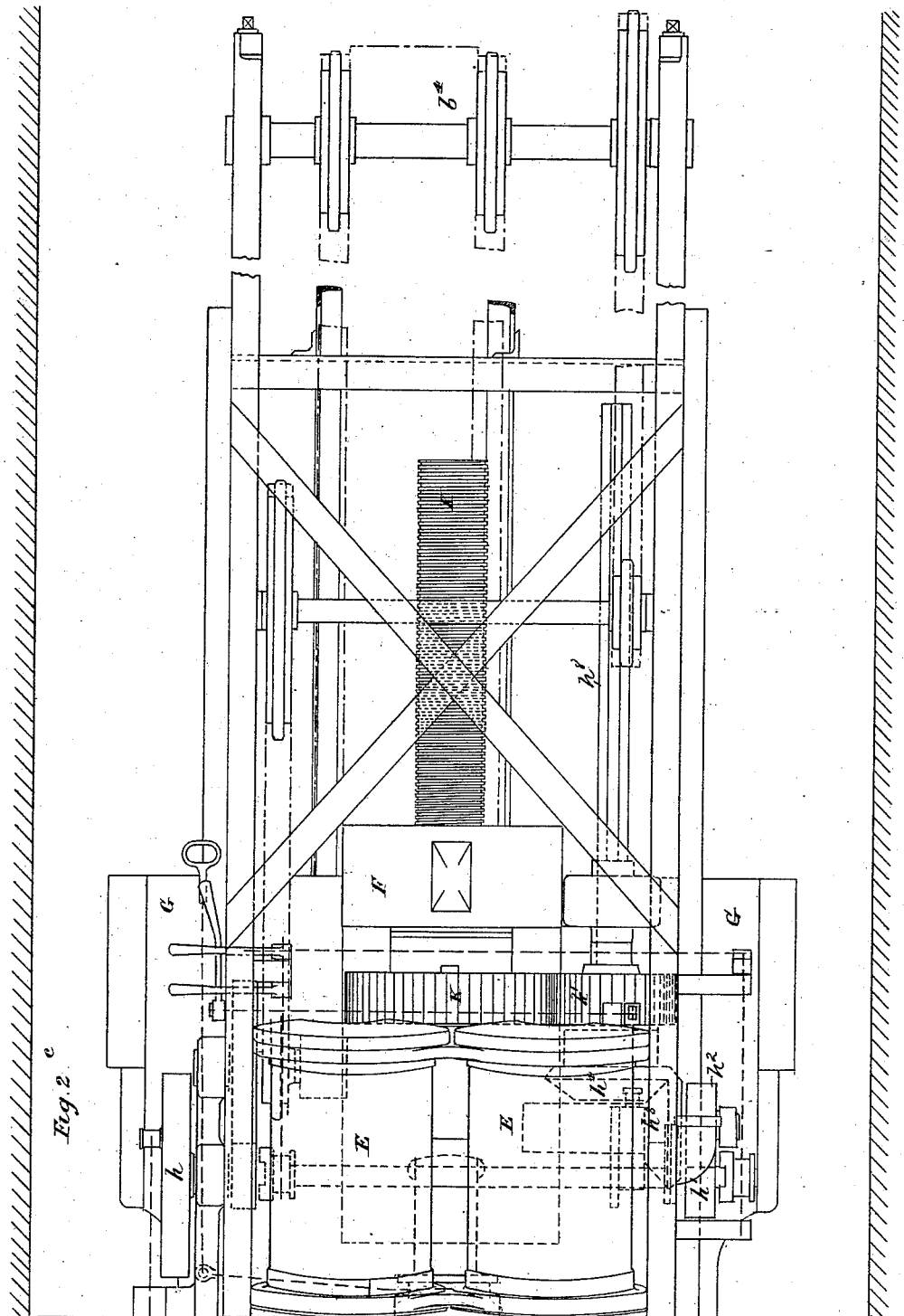

(No Model.) 10 Sheets—Sheet 8.

T. ENGLISH.
TUNNELING MACHINE.

No. 307,278. Patented Oct. 28, 1884.

Witnesses.
Jo. L. Coombs
Robert Everett

Inventor.
Thomas English,
By James L. Norris
Atty.

N. PETERS, Photo-Lithographer, Washington, D. C.

(No Model.) 10 Sheets—Sheet 9.
T. ENGLISH.
TUNNELING MACHINE.
No. 307,278. Patented Oct. 28, 1884.
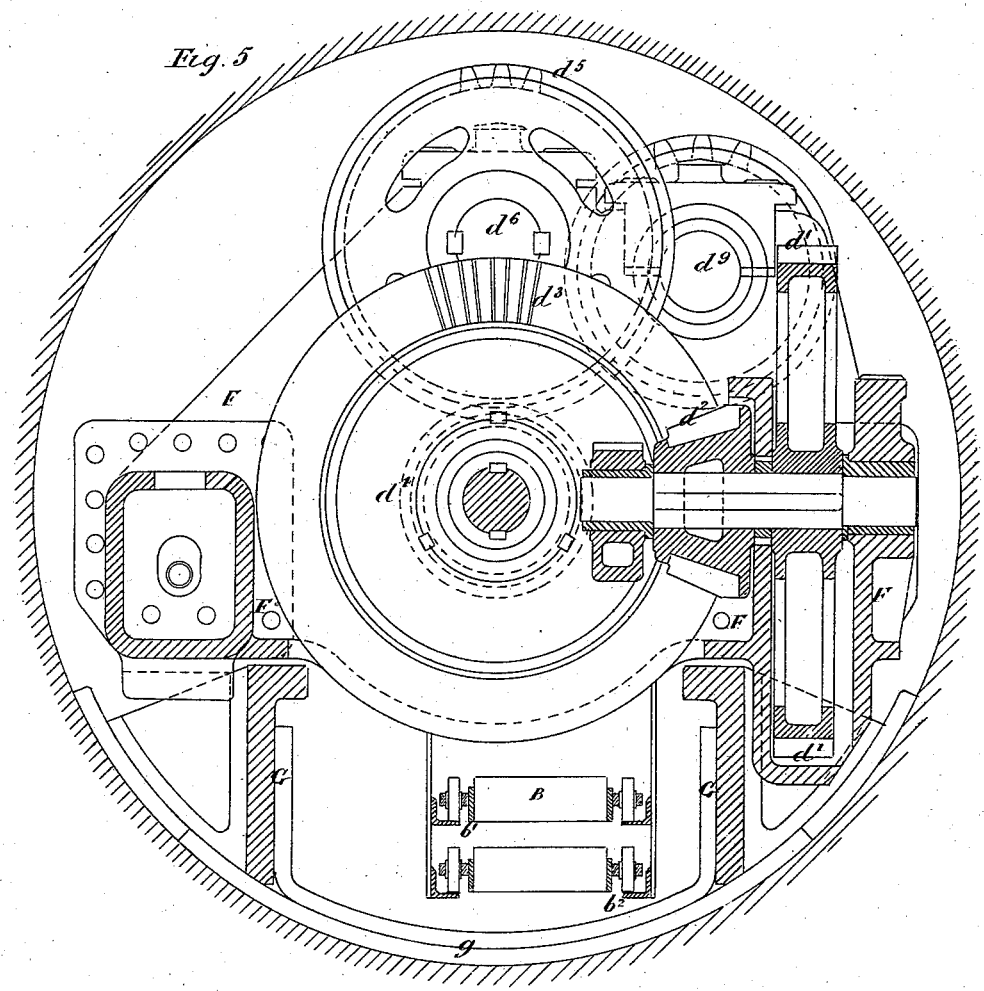
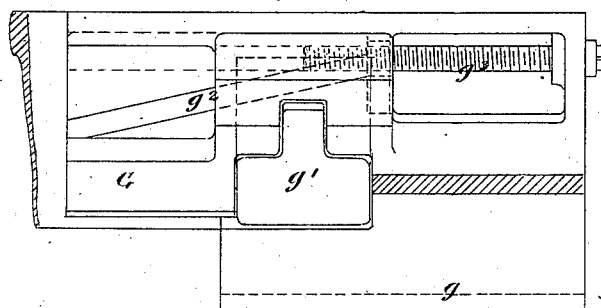
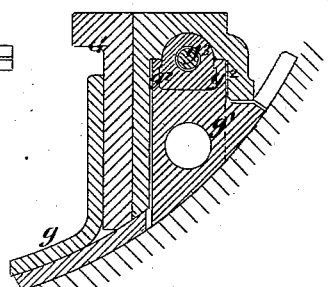
Witnesses,
Jo. L. Coombs
Robt Everett
Inventor
Thomas English.
By James L. Norris.
Atty.

(No Model.) 10 Sheets—Sheet 10.

T. ENGLISH.
TUNNELING MACHINE.

No. 307,278. Patented Oct. 28, 1884.

Witnesses.

Inventor,
Thomas English.
By James L. Norris
Atty

United States Patent Office.

THOMAS ENGLISH, OF HAWLEY, NEAR DARTFORD, COUNTY OF KENT, ENGLAND.

TUNNELING-MACHINE.

SPECIFICATION forming part of Letters Patent No. 307,273, dated October 28, 1884.

Application filed June 4, 1884. (No model.) Patented in England October 25, 1880, No. 4,347, and December 5, 1881, No. 5,317; in France, November 11, 1880, No. 139,593, and in Belgium December 18, 1882, No. 59,891.

*To all whom it may concern:*

Be it known that I, THOMAS ENGLISH, a citizen of England, residing at Hawley, near Dartford, in the county of Kent, England, have invented a new and useful Tunneling-Machine, (for which I have obtained patents in Great Britain, No. 4,347, dated October 25, 1880; No. 5,317, dated December 5, 1881; France, dated November 11, 1880, No. 139,593; Belgium, dated December 18, 1882, No. 59,891, and France, dated May 31, 1882, No. 139,593,) of which the following is a specification.

My invention relates to a machine for boring a circular tunnel, which is constructed as I will describe, referring to the accompanying drawings.

Figure 1:
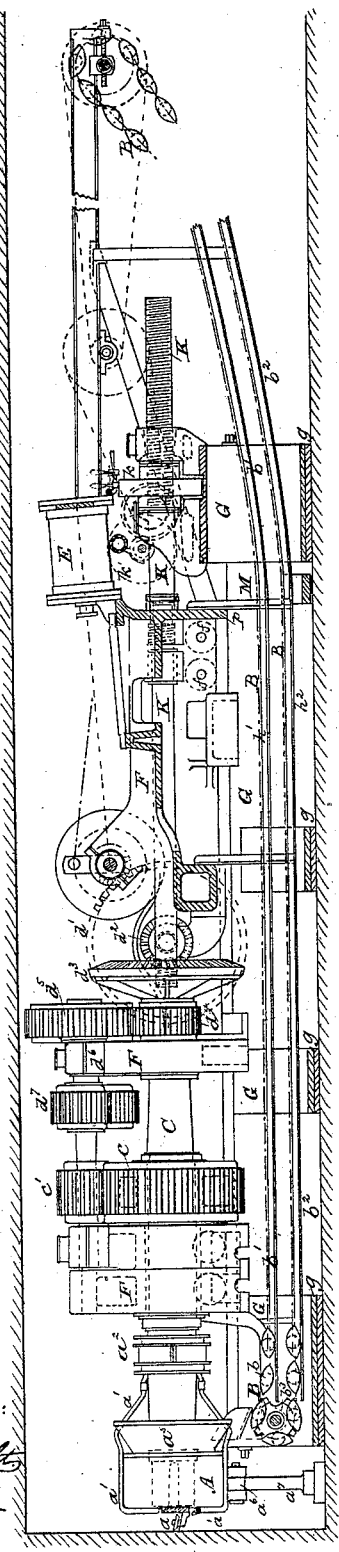
Figure 2:
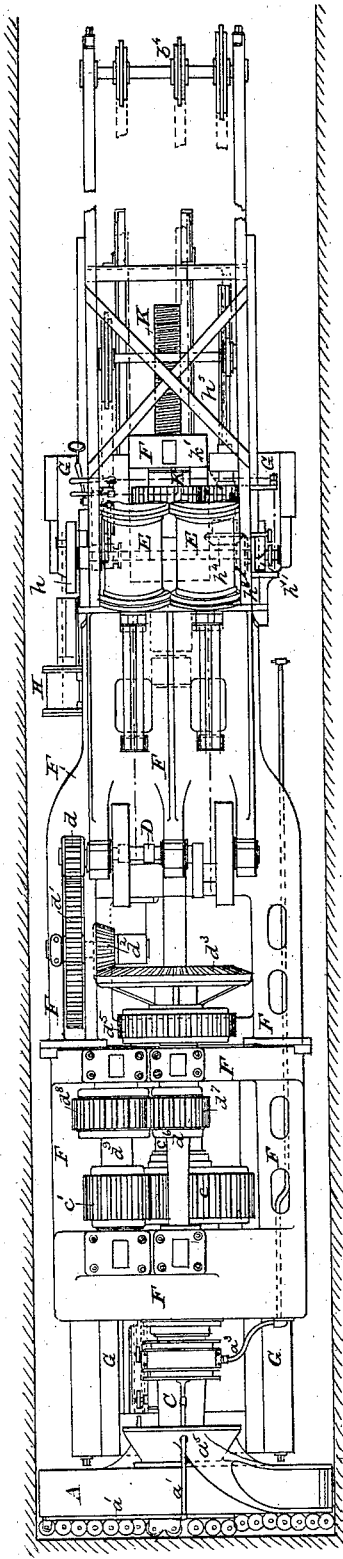
Figure 3:
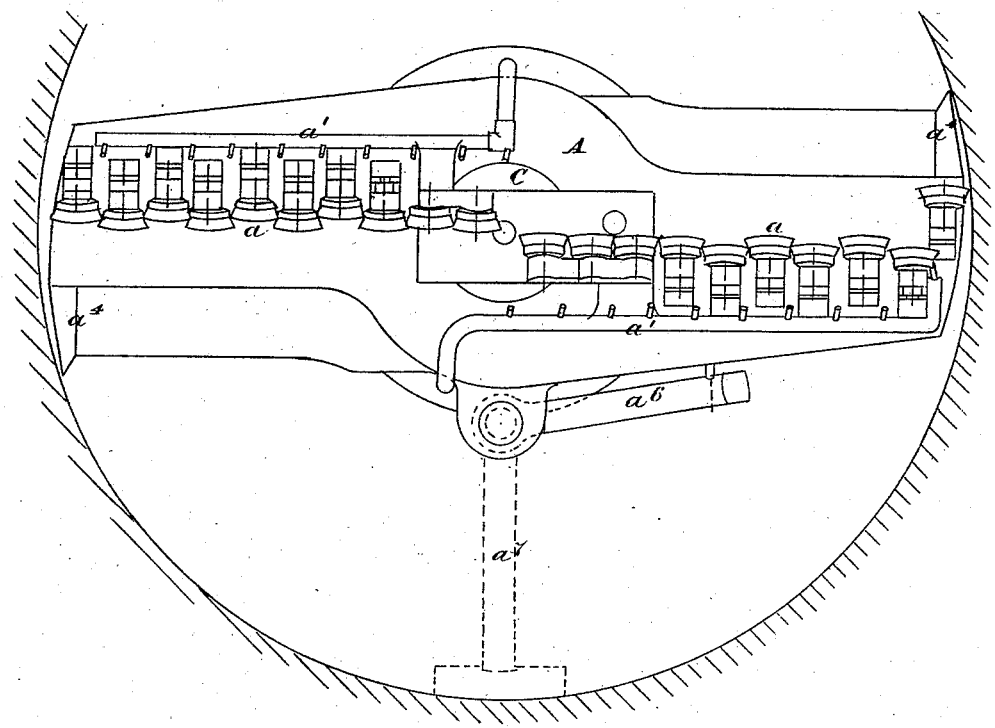
Figure 4:
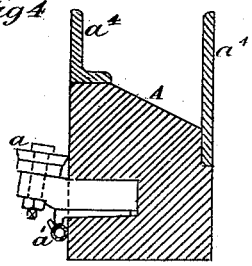
Figure 8:
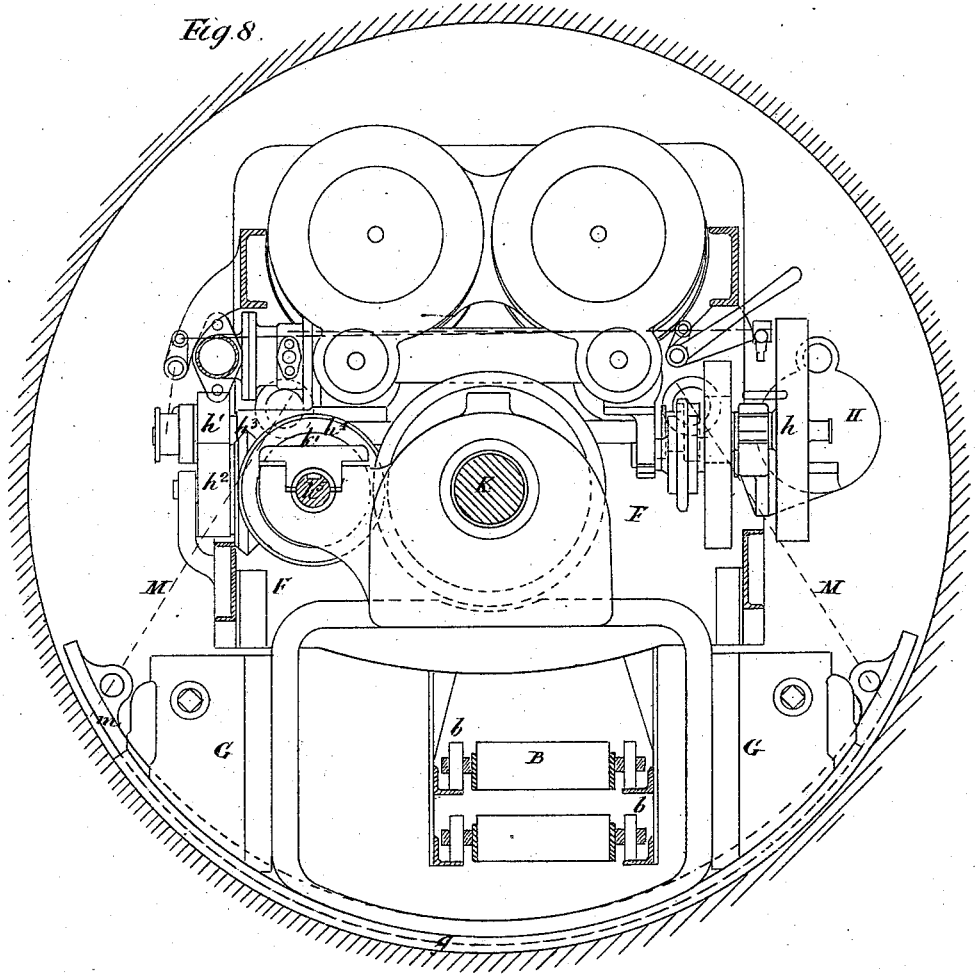
Figure 9:
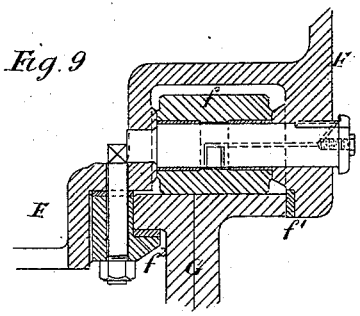

Figure 1 is a side view of the machine, partly in section, with portions broken away, and Fig. 2 is a plan of the machine with portions broken away, said figures being on a smaller scale than the other figures. Figs. 1ª, 1ᵇ, and 1ᶜ, if joined together at the lines X and Y, represent a longitudinal section, and Figs. 2ª, 2ᵇ, 2ᶜ, if also joined at X and Y, represent a plan of the machine. Fig. 3 is a front view of the boring-head. Fig. 4 is a section of one of its arms, showing one of the cutters fixed therein. Fig. 5 is a transverse section at Z, Fig. 2ᵇ. Fig. 6 is a side view, and Fig. 7 a transverse section, of part of the under frame, showing the means of adjusting level. Fig. 8 is a transverse section behind the engine-cylinders, and Fig. 9 is a part transverse section showing the bearing and guiding of the upper on the lower frame.

The boring-head A consists of a strong boss having two arms projecting radially from it, each arm having a number of cutters, $a$, fixed in front of it. These cutters are of various kinds, according to the character of rock or material through which the tunnel has to be bored. I have shown them of a form which I have found suitable for sandstone and limestone rock, each cutter being a bevel-edged disk that is fixed on a holder, and can be turned partly round when one part of it becomes blunted. Pipes $a'$ convey water to the cutters, these pipes having a number of small nozzles directing jets of water upon the cutters, or on the material on which the cutters operate. The pipes $a'$, which revolve with the head A, are supplied from a cavity in a stationary sleeve, $a^2$, which is supplied by a pipe, $a^3$, and this sleeve having stuffing-boxes, as shown in Figs. 1ª and 2ª. The arms of the head A are sloped and provided with scrapers and guard-plates $a^4$, so as to raise and conduct a large proportion of the débris into a conical chute, $a^5$, attached to the head, whence it is discharged into a series of traveling buckets or skips, B. These skips B are linked together so as to form a continuous chain, each skip having two rollers, $b$, which run along rails $b'$ $b^2$ from chain-wheels $b^3$ at the front of the machine to chain-wheels $b^4$ at the rear. The latter-wheels, $b^4$, may be driven from the engine which works the machine, but I prefer to drive them, as shown, by a separate engine. They are situated at some distance behind the machine, and at a sufficient height (as indicated in Fig. 1ᶜ) to allow the skips B as they turn over to discharge their contents into trucks below. The boring-head A has hinged to it a foot, $a^6$, which while the machine is working is turned up against one of the arms and held by a catch, but is let down to rest on a block, as indicated by the dotted lines $a^7$, Figs. 1ª and 3, to support the boring-head while the under frame is moved. By making the block of suitable depth, the bringing of the foot $a^7$ to a vertical position by turning the head makes it act as a toggle, raising the front of the machine. The head A is fixed on a longitudinal shaft, C, which is caused to revolve slowly in the following manner: A compressed-air engine, having two cylinders, E, and crank-shaft D, by spur-gear $d$ $d'$, bevel-gear $d^2$ $d^3$, and spur-gear $d^4$ $d^5$, works a counter-shaft, $d^6$. This, by spur-gear $d^7$ $d^8$, works a second counter-shaft, $d^9$, and a spur-pinion, $c'$, on the shaft $d^9$, gears with a wheel, $c$, on the shaft C, which thus receives a slow movement of rotation. The engine E E, and the shafts and gear above mentioned, are all carried on a strong upper frame, F, which, as shown in Fig. 9, has rollers $f$ mounted on it at each side to run on the upper flanges of a lower frame, G, the frame F being guided laterally by rubbing-pieces $f'$ fitting to the edge of the outer flange of G, and being prevented from separating from G by adjustable rubbing-pieces fitting under the inner flange of G. Instead of the frame F rolling on the lower frame, G, it may be made to slide thereon. The rails $b'$ $b^2$ for the chain of buckets B, and the chain-wheels $b^3$ and $b^4$ are also suspended from and supported by the upper frame, F. The lower frame, G, has attached to it plates $g$, bent to the circular form of the tunnel on the lower part of which they rest. At each end of each side of G there is an arrangement (shown in Figs. 6 and 7) for adjusting the level and direction of the bore effected by the machine. For this purpose a block, $g'$, fitted freely in a recess in the frame G, so that it is prevented from moving transversely or longitudinally, has in its upper part two inclined chases in which fit two inclined feathers, $g^2$, formed on the sides of a slide, which constitutes the nut of the screw $g^3$. By turning this screw in one direction the inclined bottom of the slide $g^2$, acting on the inclined upper face of the block $g'$, tends to depress that block against the bottom of the tunnel, and as the bottom of the tunnel does not give way, that angle of the machine where the screw $g^3$ is worked is raised and trained a little inward. Again, when the screw $g^3$ is turned in the opposite direction, the block $g'$ is raised, and, consequently, the frame G takes its bearing on the bottom of the tunnel. By properly adjusting the four blocks $g'$ at the extreme ends of the two sides of the frame G, the direction of the bore can be a little varied.

By the side of the main compressed-air engine E E is a separate compressed-air engine, of which H is the cylinder and $h$ the fly-wheel. This engine is capable of being worked in either direction.

On the shaft of the fly-wheel $h$, which shaft extends across the frame, is a pinion, $h'$, gearing with a wheel, $h^2$, on a short shaft having on it a bevel-wheel, $h^3$, gearing with a bevel-wheel, $h^4$, on a longitudinal shaft, $h^5$. On this shaft is fitted to slide along a feather or key a pinion, $k'$, which gears with a wheel, $k$. This wheel, which is held between anti-friction collars in a recess between upward projections from the lower frame, G, forms a nut for a screw, K. This screw is coupled at its front end to the shaft C of the boring-head, so as to revolve with it. The nut $k$ can be held stationary, or can, by means of the engine H, be driven in either direction at various speeds, while the screw K either revolves along with the shaft of the boring-head or remains stationary, and thus the upper frame, F, can be made to slide forward or backward along the lower frame, G; or, if the upper frame, F, be stationary, the lower frame, G, can be made to move forward or backward relatively to it. Such being the construction of the machine, its action is as follows: The lower frame, G, resting on the bottom of the tunnel, the engines E E cause the boring-head A to revolve slowly against the rock or material to be excavated, while the screw K, revolving along with the head through the nut, (the nut being stationary or made to revolve in either direction, so as to give a feed suited to the character of the material operated on,) causes the upper frame, F, and all that it carries to advance, the head cutting its way forward and the débris being carried back by the chain of skips and discharged into trucks at the rear. When the upper frame, F, has advanced a distance determined by the length of the machine, the engines E E are stopped and the foot $a^6$ is turned down to the position $a^7$, so as to lift and support the boring-head, and then, by means of screw or other suitable jacks applied at M M, having their lower ends jointed to a plate, $m$, bearing against the bottom of the tunnel, while their upper ends are jointed to the upper frame, F, the whole machine is raised a little, so as to remove the lower frame, G, from contact with the bottom of the tunnel. The nut $k$ is then caused to revolve in a backward direction, and thereby, while the upper frame, F, remains stationary, the lower frame, G, is advanced a distance equivalent to the stroke of the machine. The jacks M M being then slacked back and the foot $a^7$ turned up and hooked to the head, so that the lower frame, G, again takes its bearing on the bottom of the tunnel, the boring is recommenced and continued as far as the stroke of the machine permits. Thus step by step the boring is advanced, the upper frame, F, moving forward during the boring, while the lower frame, G, remains at rest, and then the machine being raised and the lower frame, G, being moved forward while the upper frame is stationary.

Having thus described the nature of my invention and the best means I know of carrying it out in practice, I claim—

1. In a tunneling-machine, the combination of a lower frame, upward projections from said frame supporting a nut held between anti-friction collars, a reciprocating upper frame carrying a boring head and shaft, compressed-air engines and gearing carried by same for operating the said head and shaft, and a feed-screw passed through said nut and adapted to be connected to the shaft of the boring-head, whereby the several parts may operate, substantially as described.

2. In a tunneling-machine, the combination of a lower frame, an upper frame to travel over the same, a boring-head carried by the upper frame, a track and chain of buckets suspended from the said frame, and a conical chute connected to the boring-head to pass the borings therefrom to the chain of buckets, substantially as set forth.

In testimony whereof I have signed my name to this specification, in the presence of two subscribing witnesses, this 20th day of May, A. D. 1884.

THOMAS ENGLISH.

Witnesses:
OLIVER IMRAY,
JNO. P. M. MILLARD.